US008577908B2

(12) United States Patent
Dettinger et al.

(10) Patent No.: US 8,577,908 B2
(45) Date of Patent: *Nov. 5, 2013

(54) AUTOMATIC LOCK MANAGEMENT IN AN ABSTRACT DATABASE

(75) Inventors: Richard D. Dettinger, Rochester, MN (US); Frederick A. Kulack, Rochester, MN (US); Richard J. Stevens, Mantorville, MN (US); Eric W. Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 2459 days.

This patent is subject to a terminal disclaimer.

(21) Appl. No.: 10/393,305

(22) Filed: Mar. 20, 2003

(65) Prior Publication Data

US 2004/0186825 A1 Sep. 23, 2004

(51) Int. Cl.
*G06F 7/00* (2006.01)
*G06F 17/30* (2006.01)

(52) U.S. Cl.
USPC ............................ 707/760; 707/704; 707/804

(58) Field of Classification Search
USPC ............... 707/1–10, 101–104, 704, 760, 804; 717/100–119
See application file for complete search history.

(56) References Cited

U.S. PATENT DOCUMENTS

| 6,553,368 | B2 | 4/2003 | Martin et al. |
| 6,725,227 | B1 | 4/2004 | Li |
| 6,892,204 | B2 * | 5/2005 | Haas et al. ..................... 707/100 |
| 6,928,431 | B2 | 8/2005 | Dettinger et al. |
| 6,954,748 | B2 | 10/2005 | Dettinger et al. |
| 7,096,229 | B2 | 8/2006 | Dettinger et al. |
| 2002/0078068 | A1 | 6/2002 | Krishnaprasad et al. |
| 2003/0172056 | A1 | 9/2003 | Dettinger et al. |
| 2004/0148587 | A1 * | 7/2004 | Conrad et al. ................. 717/108 |

* cited by examiner

*Primary Examiner* — Shew-Fen Lin
(74) *Attorney, Agent, or Firm* — Patterson & Sheridan LLP

(57) ABSTRACT

A method, system and article of manufacture for accessing data in a database independent of the particular manner in which the data is physically represented and for preventing alterations of data in the database when a query is executed against the database are provided. One embodiment provides a method of preventing alterations of data in a database when a query is executed against the database. The method includes providing a logical representation of the data defining a plurality of logical fields abstractly describing associated physical entities of the data; receiving an abstract query comprising at least one logical field of the plurality of logical fields; and locking the at least one logical field before executing the abstract query.

36 Claims, 10 Drawing Sheets

AUTOMATIC LOCK MANAGEMENT IN AN ABSTRACT DATABASE

BACKGROUND OF THE INVENTION

1. Field of the Invention

The present invention generally relates to data processing in databases and more particularly to preventing alterations of data in a database when a query is executed against the database.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application or the operating system) demands access to a specified database by issuing a database access request. Such requests may include, for instance, simple catalog lookup requests or transactions or combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One of the issues faced by data mining and database query applications, in general, is their close relationship with a given database schema (e.g., a relational database schema). This relationship makes it difficult to support an application as changes are made to the corresponding underlying database schema. Further, the migration of the application to alternative underlying data representations is inhibited. In today's environment, the foregoing disadvantages are largely due to the reliance applications have on SQL, which presumes that a relational model is used to represent information being queried. Furthermore, a given SQL query is dependent upon a particular relational schema since specific database tables, columns and relationships are referenced within the SQL query representation. As a result of these limitations, a number of difficulties arise.

One difficulty is that changes in the underlying relational data model require changes to the SQL foundation that the corresponding application is built upon. Therefore, an application designer must either forgo changing the underlying data model to avoid application maintenance or must change the application to reflect changes in the underlying relational model. Another difficulty is that extending an application to work with multiple relational data models requires separate versions of the application to reflect the unique SQL requirements driven by each unique relational schema. Yet another difficulty is evolution of the application to work with alternate data representations because SQL is designed for use with relational systems. Extending the application to support alternative data representations, such as XML, requires rewriting the application's data management layer to use non-SQL data access methods.

A typical approach used to address the foregoing problems is software encapsulation. Software encapsulation involves using a software interface or component to encapsulate access methods to a particular underlying data representation. An example is found in the Enterprise JavaBean (EJB) specification that is a component of the Java 2 Enterprise Edition (J2EE) suite of technologies. In the case of EJB, entity beans serve to encapsulate a given set of data, exposing a set of Application Program Interfaces (APIs) that can be used to access this information. This is a highly specialized approach requiring the software to be written (in the form of new entity EJBs) whenever a new set of data is to be accessed or when a new pattern of data access is desired. The EJB model also requires a code update, application build and deployment cycle to react to reorganization of the underlying physical data model or to support alternative data representations. EJB programming also requires specialized skills, since more advanced Java programming techniques are involved. Accordingly, the EJB approach and other similar approaches are rather inflexible and costly to maintain for general-purpose query applications accessing an evolving physical data model.

Another shortcoming of the prior art, is the manner in which information can be presented to the user. A number of software solutions support the use of user-defined queries, in which the user is provided with a tool to construct a query that meets the user's specific data selection requirements. In an SQL-based system, the user is given a list of underlying database tables and columns to choose from when building a query. The user must decide which tables and columns to access based on the naming convention used by the database administrator. This approach does not provide an effective way to subset the set of information presented to the user. As a result, even nonessential content is revealed to the user.

Further, existing database environments do not effectively accommodate multiple users desiring to access different portions of the same physical data simultaneously. Typically, such simultaneous access is accomplished by each user using a separate application. Each application is written to expose the desired data to the respective users. Accordingly, substantial overhead in application development results in today's database environments.

Assuming a solution to the foregoing difficulties, another issue which must be addressed is the manner in which simultaneous queries and updates on shared data are handled in a database environment. A typical approach used to address this problem is the introduction of transaction processing environments. Transaction processing is the management of discrete units of work that access and update shared data. A unit of work is a sequence of associated operations which transforms a consistent state of a recoverable resource into another consistent state. For instance, the business function of a commercial application program typically involves processing many similar items, for example orders in an order processing system or seat reservations in an airline booking system. The processing of one of these items, i.e., the execution of this discrete unit of processing, is a transaction. A unit of work must either be fully completed and committed at completion of the transaction, or fully purged without action, i.e., rolled back. When a transaction is committed, all changes made by the associated requests are made permanent.

In a typical transaction processing environment, many users repeatedly process similar transactions. Transaction processing is particularly effective for the processing of unscheduled single items in unpredictable volumes and sequence, for changing data in a database to reflect updates as they are processed, and for providing immediate on-line access to data that has been updated to reflect all previous transactions.

Access to and update of shared resources with integrity is one of the basic functions and characteristics that are usually required of transaction processing systems. Very large numbers of transactions may read or cause changes to a database or data warehouse. It is important that transactions read valid data and that their updates are correctly recorded. Ensuring this is called maintaining data integrity.

Maintaining data integrity is performed in a typical transaction processing environment by specifying transaction properties and data isolation based on some physical model. For example, a particular database connection has an isolation level, and every access to any data by that connection locks the data appropriately, or an application has an isolation level and all access by that application locks the data appropriately, or an application or transaction monitor chooses the isolation level for a single SQL statement. However, both important and unimportant data are accessed by the application or connection and are locked in the same way.

Therefore, there is a need for an improved and more flexible transaction paradigm for maintaining data integrity in a database preventing alterations of queried data when a query is executed against the database.

SUMMARY OF THE INVENTION

The present invention generally is directed to a method, system and article of manufacture for accessing data in a database independent of the particular manner in which the data is physically represented and for preventing alterations of data in the database when a query is executed against the database.

One embodiment for preventing alterations of data in a database when a query is executed against the database comprises providing a logical representation of the data defining a plurality of logical fields abstractly describing associated physical entities of the data; receiving an abstract query comprising at least one logical field of the plurality of logical fields; and locking the at least one logical field before executing the abstract query.

Another embodiment comprises providing a logical representation of the data defining a multiplicity of logical fields, each logical field abstractly describing an associated physical entity of the data; providing a lock object for each logical field of a plurality of logical fields forming a subset of the multiplicity of logical fields; receiving an abstract query from a requesting entity comprising at least one logical field of the multiplicity of logical fields; determining whether executing the abstract query against the database requires a lock on the at least one logical field; and if executing the abstract query against the database requires the lock on the at least one logical field: determining the lock object of the at least one logical field; and locking the lock object for the requesting entity for locking the at least one logical field before executing the abstract query.

Still another embodiment provides a computer-readable medium containing a program which, when executed by a processor, performs an operation of preventing alterations of data in a database when a query is executed against the database. The operation comprises providing a logical representation of the data defining a plurality of logical fields abstractly describing associated physical entities of the data; receiving an abstract query comprising at least one logical field of the plurality of logical fields; and locking the at least one logical field before executing the abstract query.

Still another embodiment provides a computer-readable medium containing a program which, when executed by a processor, performs an operation of preventing alterations of physical entities of data in a database when a query is executed against the database. The operation comprises providing a logical representation of the data defining a multiplicity of logical fields, each logical field abstractly describing an associated physical entity of the data; providing a lock object for each logical field of a plurality of logical fields forming a subset of the multiplicity of logical fields; receiving an abstract query from a requesting entity comprising at least one logical field of the multiplicity of logical fields; determining whether executing the abstract query against the database requires a lock on the at least one logical field; and if executing the abstract query against the database requires the lock on the at least one logical field: determining the lock object of the at least one logical field; and locking the lock object for the requesting entity for locking the at least one logical field before executing the abstract query.

Yet another embodiment provides a computer, comprising a database containing data; a data abstraction model defining a plurality of logical fields abstractly defining the data; a query building application for building abstract queries according to the data abstraction model; a runtime component configured to transform the abstract queries into concrete queries having a form consistent with the data; and a locking mechanism for selectively locking one or more logical fields of an abstract query to prevent alterations of the data while a concrete query, corresponding to the abstract query after being transformed, is executed against the database.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
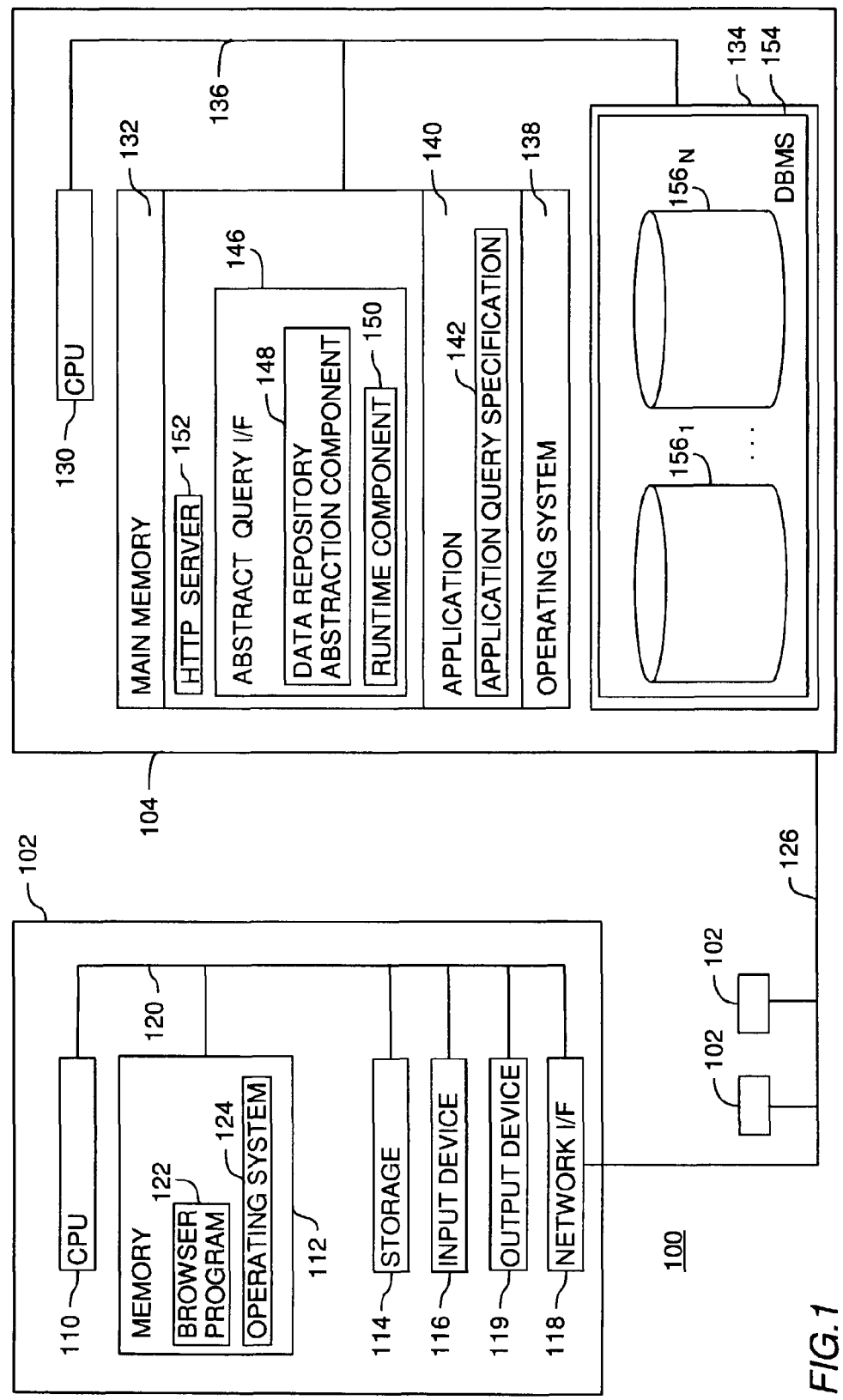
FIG. 1 is one embodiment of a computer system utilized in accordance with the invention.

The present invention is generally directed to a system, method and article of manufacture for processing data in databases and more particularly for preventing alterations of data in a database when a query is executed against the database. In one embodiment, a data repository abstraction layer provides a logical view of the underlying data repository that is independent of the particular manner in which the data is physically represented. The data repository abstraction layer represents a data abstraction model that defines a plurality of logical fields abstractly defining the data. A query abstraction layer is also provided and is based on the data repository abstraction layer. The query abstraction layer includes a query building application for building abstract queries according to the data abstraction model. The query building application is implemented as a data query builder provided, e.g., as a single application that accesses the data repository abstraction as if it were a physical database. A runtime component representing a data query abstraction component performs translation of abstract queries into concrete queries having a form consistent with the data. A concrete query can be used against a particular physical data representation. The data query abstraction component services logical data access requests of the data query builder, without giving the data query builder the knowledge that the physical data representation exists, nor about the physical queries, i.e., the concrete queries resulting from the abstract queries. A lock management component implements a locking mechanism for selectively locking one or more logical fields of an abstract query to prevent alterations of the data while the concrete query, corresponding to the abstract query after being transformed, is executed against the database.

In one embodiment, the data repository abstraction layer includes multiple data repository abstraction components/instances which coexist (and, in some embodiments, cooperate) within a single application space. The provision of multiple instances of data repository abstractions allows different sets of data to be exposed to different users.

One embodiment of the invention is implemented as a program product for use with a computer system such as, for example, the computer system shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Physical View of Environment

FIG. 1 depicts a block diagram of a networked system 100 in which embodiments of the present invention may be implemented. In general, the networked system 100 includes a client (e.g., user's) computer 102 (three such client computers 102 are shown) and at least one server 104 (one such server 104 is shown). The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 120 to a memory 112, storage 114, an input device 116, an output device 119, and a network interface device 118. The input device 116 can be any device to give input to the client computer 102. For example, a keyboard, keypad, light-pen, touch-screen, track-ball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products having a plurality of instructions that are resident at various times in various memory and storage devices in the computer system 100. When read and executed by one or more processors 130 in the server 104, the applications 140 and the abstract query interface 146 cause the computer system 100 to perform the steps necessary to execute steps or elements embodying the various aspects of the invention. The applications 140 (and more generally, any requesting entity, including the operating system 138 and, at the highest level, users) issue queries against a database (e.g., databases $156_1 \ldots 156_N$, collectively referred to as database(s) 156). Illustratively, the databases 156 are shown as part of a database management system (DBMS) 154 in storage 134. The databases 156 are representative of any collection of data regardless of the particular physical representation. By way of illustration, the databases 156 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by a data repository abstraction component 148 of the abstract query interface 146. The abstract queries are executed by a runtime component 150 which first transforms the abstract queries into a form consistent with the physical representation of the data contained in the DBMS 154, e.g., by translating abstract queries into concrete queries. The runtime component 150 further implements a locking mechanism for selectively locking one or more logical fields of an abstract query to prevent alterations of the corresponding data contained in the DBMS 154 while the concrete query, corresponding to the abstract query after being transformed, is executed against the database. The locking mechanism may alternatively be implemented as a lock management component (e.g., lock manager 210 of FIG. 2A) separate from the runtime component 150 and stored, e.g., in the main memory 132. The application query specification 142, the abstract query interface 146 and the locking mechanism are further described with reference to FIGS. 2A-B.

In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (HTTP) server process 152 (e.g., a web server) adapted to service requests from the client computer 102. For example, the process 152 may respond to requests to access a database(s) 156, which illustratively resides on the server 104. Incoming client requests for data from a database 156 invoke an application 140. When executed by the processor 130, the application 140 causes the server computer 104 to perform the steps or elements embodying the various aspects of the invention, including accessing the database(s) 156. In one embodiment, the application 140 comprises a plurality of servlets configured to build GUI elements, which are then rendered by the browser program 122.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable to future changes in a particular markup language as well as to other languages presently unknown. Likewise, the HTTP server process 152 shown in FIG. 1 is merely illustrative and other embodiments adapted to support any known and unknown protocols are contemplated.

Logical/Runtime View of Environment

Figure 2A:
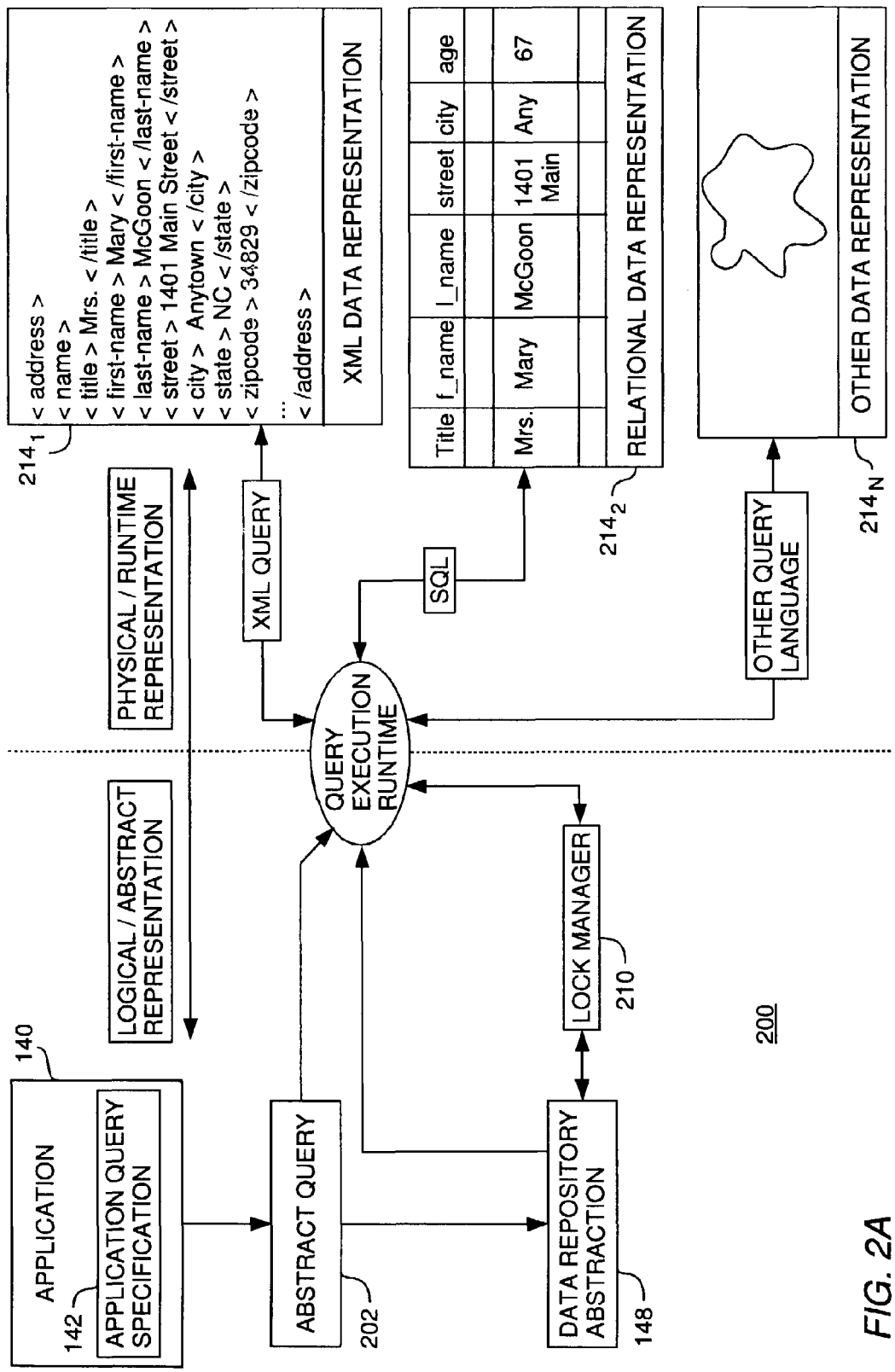
FIG. 2 is a relational view of software components of one embodiment of the invention.
Figure 2B:
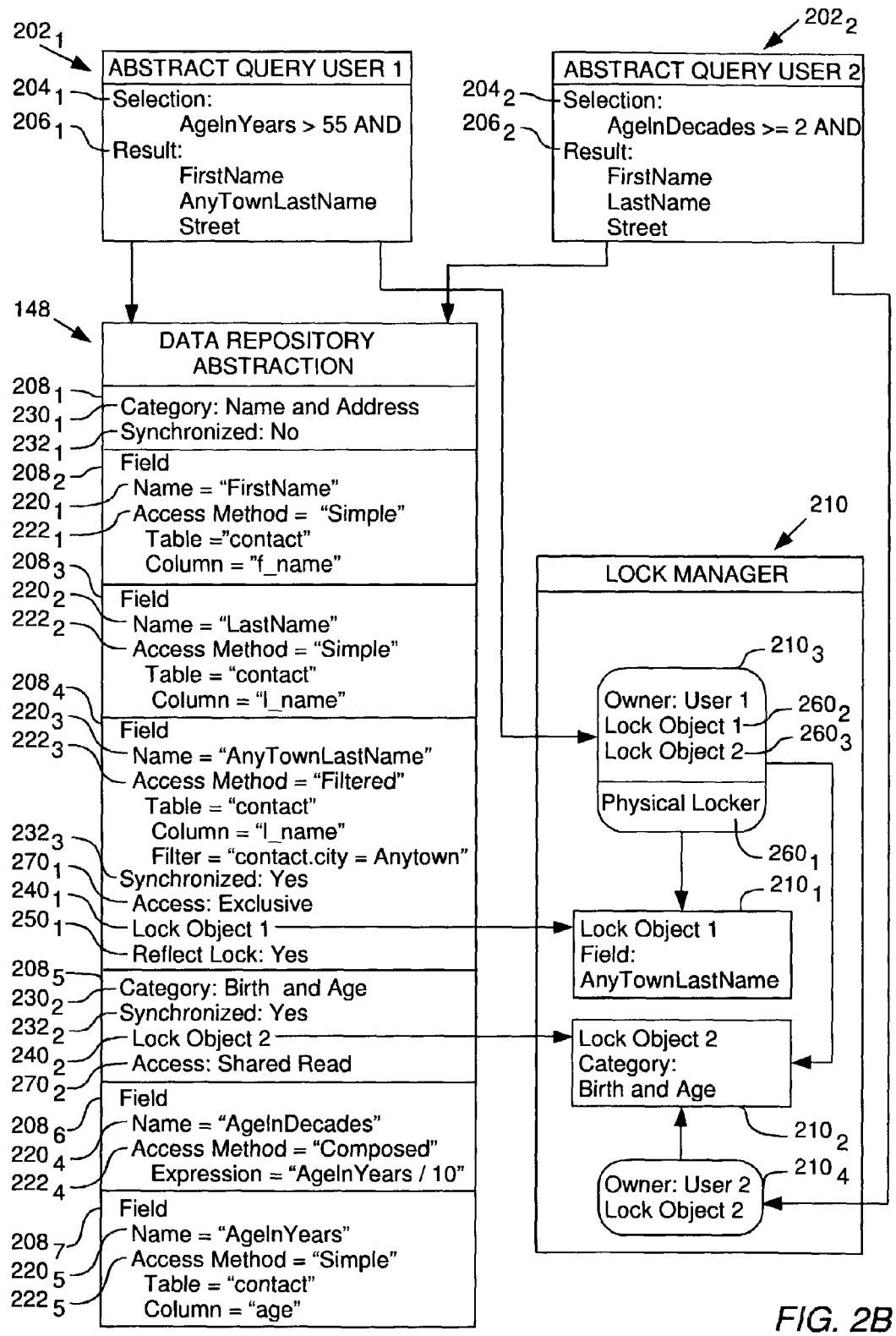

FIGS. 2A-B show an illustrative relational view 200 of components of the invention. A requesting entity (e.g., one of the applications 140 of FIG. 1) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the DBMS 154. As a result, abstract queries may be defined that are independent of the particular underlying data representation used. In one embodiment, the application query specification 142 may include both criteria used for data selection (selection criteria 204) and an explicit specification of the fields to be returned (return data specification 206) based on the selection criteria 204.

The logical fields specified by the application query specification 142 and used to compose the abstract query 202 are defined by the data repository abstraction component 148. In general, the data repository abstraction component 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the DBMS 154, thereby allowing queries to be formed that are loosely coupled to the underlying data representation.

In general, the data repository abstraction component 148 includes a plurality of field specifications $208_2$, $208_3$, $208_4$, $208_6$ and $208_7$ (five shown by way of example), collectively referred to as the field specifications 208. In one embodiment, a field specification is provided for each logical field available for composition of an abstract query. A logical field available for composition of an abstract query, e.g., logical fields corresponding to the field specifications 208, is associated with a corresponding physical data representation in a database.

Each field specification of a logical field available for composition of an abstract query includes a logical field name $220_1$, $220_2$, $220_3$, $220_4$, $220_5$ (collectively, field name 220) and an associated access method $222_1$, $222_2$, $222_3$, $222_4$, $222_5$ (collectively, access method 222). The access methods associate (i.e., map) the logical field names to the corresponding physical data representation $214_1$, $214_2$ ... $214_N$ in the database (e.g., one of the databases 156 of FIG. 1). By way of illustration, two data representations are shown, an XML data representation $214_1$ and a relational data representation $214_2$. However, the physical data representation $214_N$ indicates that any other data representation, known or unknown, is contemplated.

Each field specification of a logical field available for composition of an abstract query may further include a synchronization indication $232_3$, a lock type indication $270_1$, a lock object identification $240_1$ and a lock item indication $250_1$. The synchronization indication $232_3$ indicates whether queries and updates on the logical field need to be synchronized, i.e., whether the logical field must be logically locked before an operation may be performed on the underlying physical representation and/or the underlying physical data entities, in order to prevent alterations of the data. The lock type indication $270_1$ indicates one of a plurality of available logical lock types to be implemented. The plurality of logical lock types illustratively includes a shared lock, a shared read lock and an exclusive lock type. A shared lock is a logical lock that permits different applications to simultaneously access the same logical field and is, e.g., used by different applications trying to simultaneously update a logical field. A shared read lock is a logical lock that permits different applications to simultaneously read the same logical field and is, e.g., used by different applications trying to simultaneously query a logical field. An exclusive lock is a logical lock that logically locks a logical field for a single application and is, e.g., used by an application performing a maintenance operation on the underlying physical representation as, for instance, changing the format of the data stored in the physical representation. The lock object identification $240_1$ identifies a lock object that is associated with a corresponding logical field and that needs to be locked in order to logically lock the corresponding logical field. For instance, the lock object may be a programming language object that can be instantiated by the single application in order to logically lock the corresponding logical field.

If the logical field should be logically locked, the lock item indication $250_1$ indicates whether the underlying physical data representation, i.e., the underlying physical data entities, should be physically locked or not. For instance, if a time-consuming complex query is performed on the underlying physical data representation, where a processing environment requires querying valid data, it may be desirable to physically lock the underlying physical data entities. Thus, any alterations of the data during query execution, which could, e.g., be performed by an application or administrator performing a maintenance operation on the underlying physical data representation or an authorized user attempting to update the underlying physical data entities, may be prevented to maintain data integrity. In contrast thereto, if a fast selective query on non-vital data, which in general is rarely updated, should be performed, there would be no need to physically lock the underlying physical data entities.

Illustratively, logical field $208_4$ includes a field name $220_3$ "AnyTownLastName", an affirmative synchronization indication $232_3$, which is set to "Yes", a lock type indication $270_1$, which is set to "Exclusive", a lock object identification $240_1$, which identifies a lock object "Lock Object 1" $210_1$, and an affirmative lock item indication $250_1$, which is set to "Yes". Accordingly, a requesting entity that wishes to access the logical field "AnyTownLastName" would need to acquire a lock on the lock object "Lock Object 1" $210_1$, to logically lock the logical field, whereby the underlying physical data entities should be physically locked, as the lock item indication is affirmative, whereby the lock should be "exclusive".

In one embodiment, groups (i.e. two or more) of logical fields may be part of categories. Accordingly, the data repository abstraction component 148 includes a plurality of category specifications $208_1$ and $208_5$ (two shown by way of example), collectively referred to as the category specifications. In one embodiment, a category specification is provided for each logical grouping of two or more logical fields. For example, logical fields $208_{2-4}$ and $208_{6-7}$ are part of the category specifications $208_1$ and $208_5$, respectively. A category specification is also referred to herein simply as a "category". The categories are distinguished according to a category name, e.g., category names $230_1$ and $230_2$ (collectively, category name(s) 230). In the present illustration, the logical fields $208_{2-4}$ are part of the "Name and Address" category and logical fields $208_{6-7}$ are part of the "Birth and Age" category. In one embodiment, a logical lock may be specified for a category. In this way, queries involving logical fields of a locked category cannot be executed until the lock on the category is removed. Categories may be logically locked. Logically locking a category involves logically locking the logical fields that define the category. For example, in a manner similar to the way in which individual logical fields may be logically locked, categories may include a specification of a synchronization indication $232_1$, $232_2$ (collectively, synchronization indication 232), a lock type indication $270_2$ and a lock object identification $240_2$. Each of these attributes functions in substantially the same way as generally described above with respect to logical fields. Illustratively, the category specification $208_5$ is configured with a synchronization indication $232_2$, which is set to "Yes", a lock type indication $270_2$, which is set to "Shared Read", and a lock object identification $240_2$, which identifies a lock object "Lock Object 2" $210_2$.

Upon receiving the abstract query 202 from a requesting entity, a lock manager 210 (e.g., runtime component 150 of FIG. 1) determines whether executing the abstract query 202 against the database 156 requires a logical lock on one or more logical fields specified in the abstract query 202 and/or one or more physical locks on associated physical entities of data. If executing the abstract query 202 against the database 156 requires a logical lock on one or more logical fields, the lock manager 210 identifies lock object(s) $210_1$, $210_2$ of the one or more logical fields and locks the lock object(s) $210_1$, $210_2$ for the requesting entity for logically locking the one or more logical fields before executing the abstract query 202.

In one embodiment, the lock manager 210 maintains owner objects. An owner object is created for each abstract query, i.e., for each request (from a requesting entity) to access a logical field that needs to be logically locked. The owner object comprises indications of all lock objects $210_1$, $210_2$ locked by the requesting entity associated with the owner object.

Illustratively, two abstract queries $202_1$, $202_2$ issued by two requesting entities are shown. A first requesting entity (issuing the first abstract query $202_1$) is associated with "User 1" and a second requesting entity (issuing the second abstract query $202_2$) is associated with "User 2". Accordingly, two owner objects $210_3$, $210_4$ have been created for the first and second requesting entities, respectively. The first requesting entity locks lock objects $210_1$, $210_2$ for logically locking logical field $208_4$ and category $208_{6-7}$. Corresponding object indications $260_2$, $260_3$ of the lock objects $210_1$, $210_2$, respectively, are provided in the owner object $210_3$. Any type of setting an object indication is contemplated, as for example, setting a flag.

Thus, a requesting entity that wishes, e.g., to update the one or more associated physical entities of the data, accesses the owner objects $210_3$, $210_4$ maintained by the lock manager 210, to determine which lock objects are currently locked by requesting entities in order to determine whether updates may currently be performed or need to be delayed.

Furthermore, owner object $210_3$ illustratively includes a physical locker $260_1$. As described above, by way of example, logical field $208_4$ has an affirmative lock item indication $250_1$, indicating that the corresponding physical entity of the data should be locked. In other words, the corresponding physical entity of the data will be physically locked in addition to the logical field $208_4$, which will be logically locked. Physical locker $260_1$ is a resource that can be used to acquire a physical lock on the corresponding physical entity of the data. The physical locker may be, for example, an SQL connection to the corresponding physical entity of the data. To effectively physically lock the corresponding physical entity of the data, e.g., in a relational database environment, a LOCK TABLE SQL statement may be used and a particular SQL statement can be executed that accesses the physical data and allows the physical entity of the data to be physically locked.

In one embodiment, a single data repository abstraction component 148 contains field specifications (with associated access methods) and category specifications for two or more physical data representations 214. In an alternative embodiment, a different single data repository abstraction component 148 is provided for each separate physical data representation 214. In yet another embodiment, multiple data repository abstraction components 148 are provided, where each data repository abstraction component 148 exposes different portions of the same underlying physical data (which may comprise one or more physical data representations 214). In this manner, a single application 140 may be used simultaneously by multiple users to access the same underlying data where the particular portions of the underlying data exposed to the application are determined by the respective data repository abstraction component 148.

Any number of access methods is contemplated depending upon the number of different types of logical fields to be supported. In one embodiment, access methods for simple fields, filtered fields and composed fields are provided. The field specifications $208_2$, $208_3$ and $208_7$ exemplify simple field access methods $222_1$, $222_2$, and $222_5$, respectively. Simple fields are mapped directly to a particular entity in the underlying physical data representation (e.g., a field mapped to a given database table and column). By way of illustration, the simple field access method $222_1$ shown in FIG. 2B maps the logical field name $220_1$ ("FirstName") to a column named "f_name" in a table named "contact". The field specification $208_4$ exemplifies a filtered field access method $222_3$. Filtered fields identify an associated physical entity and provide rules used to define a particular subset of items within the physical data representation. An example is provided in FIG. 2B in which the filtered field access method $222_3$ maps the logical field name $220_3$ ("AnyTownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_6$ exemplifies a composed field access method $222_4$. Composed access methods compute a logical field from one or more physical fields using an expression supplied as part of the access method definition. In this way, information which does not exist in the underlying data representation may be computed. In the example illustrated in FIG. 2B the composed field access method $222_4$ maps the logical field name $220_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the data repository abstraction component 148 shown in FIG. 2A are representative of logical fields mapped to data represented in the relational data representation $214_2$. However, other instances of the data repository extraction component 148 map logical fields to other physical data representations, such as XML data representation $214_1$.

An illustrative abstract query corresponding to the abstract query $202_1$ shown in FIG. 2B is shown in Table I below. By way of illustration, the illustrative abstract query is defined using XML. However, any other language may be used to advantage.

TABLE I

QUERY EXAMPLE

001 <?xml version="1.0"?>
002 <!--Query string representation: (AgeInYears > "55"-->
003 <QueryAbstraction>
004   <Selection>
005     <Condition internalID="4">
006       <Condition field="AgeInYears" operator="GT" value="55"
007 internalID="1"/>
008   </Selection>
009   <Results>
010     <Field name="FirstName"/>
011     <Field name="AnyTownLastName"/>
012     <Field name="Street"/>
013   </Results>
014 </QueryAbstraction>

Illustratively, the abstract query shown in Table I includes a selection specification (lines 004-008) containing selection criteria and a results specification (lines 009-013). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstrac query may consist of a field name and sort criteria.

An illustrative Data Repository Abstraction corresponding to the Data Repository Abstraction component 148 shown in FIG. 2B is shown in Table II below. By the way of illustration, the illustrative Data Repository Abstraction is defined using XML. However, any other language may be used to advantage.

the same. Rather, each user is exposed to selected portions of the physical data layer 330 according to the definition of the data abstraction layer 320. More particularly, the data abstraction layer 320 illustratively includes two data repository abstraction components, DRA1 342 and DRA2 352, which define the data that will be exposed to the users 340, 350, respectively, via the application layer 310. The data abstraction layer 320 may comprise a data query abstraction

TABLE II

DATA REPOSITORY ABSTRACTION EXAMPLE

```
001 <?xml version="1.0"?>
002 <DataRepository>
003   <Category name="Name and Address">
004     <Field queryable="Yes" name="FirstName" displayable="Yes">
005       <AccessMethod>
006         <Simple columnName="f_name" tableName="contact"></Simple>
007       </AccessMethod>
008       <Type baseType="char"></Type>
009     </Field>
010     <Field queryable="Yes" name="LastName" displayable="Yes">
011       <AccessMethod>
012         <Simple columnName="l_name" tableName="contact"></Simple>
013       </AccessMethod>
014       <Type baseType="char"></Type>
015     </Field>
016     <Field queryable="Yes" name="AnyTownLastName" displayable="Yes">
017       <AccessMethod>
018         <Filter columnName="l_name" tableName="contact">
019         </Filter="contact.city=Anytown">
020       </AccessMethod>
021       <Synchronized
022         access="exclusive" lockobject="Lock Object 1" reflectlock="Yes">
023       </Synchronized>
024       <Type baseType="char"></Type>
025     </Field>
026   </Category>
027   <Category name="Birth and Age">
028     <Synchronized access="shared read" lockobject="Lock Object 2">
029     </Synchronized>
030     <Field queryable="Yes" name="AgeInDecades" displayable="Yes">
031       <AccessMethod>
032         <Composed columnName="age" tableName="contact">
033         </Composed Expression="columnName/10">
034       </AccessMethod>
035       <Type baseType="char"></Type>
036     </Field>
037     <Field queryable="Yes" name="AgeInYears" displayable="Yes">
038       <AccessMethod>
039         <Simple columnName="age" tableName="contact"></Simple>
040       </AccessMethod>
041       <Type baseType="char"></Type>
042     </Field>
043   </Category>
044 </DataRepository>
```

Figure 3:
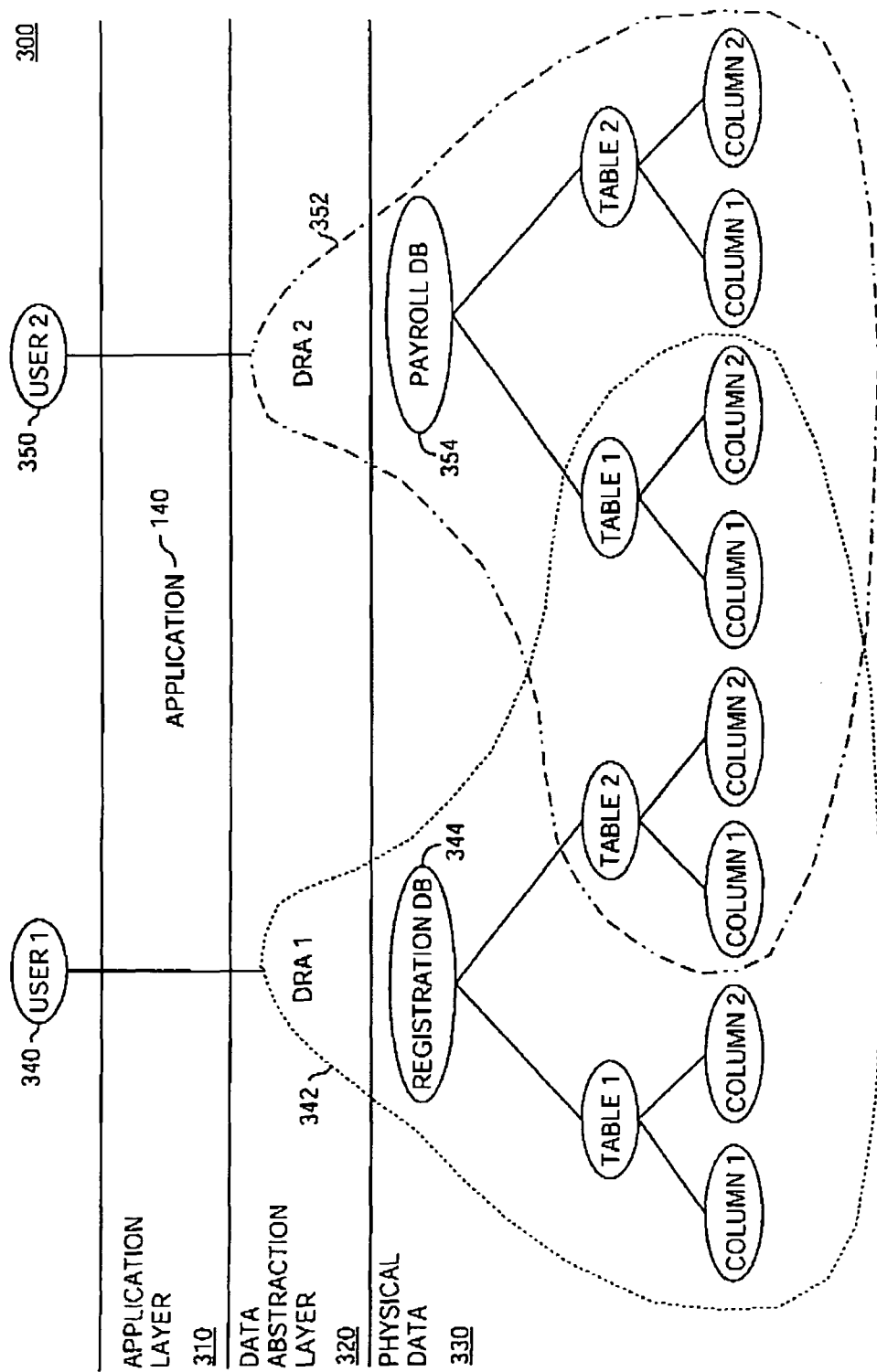
FIG. 3 illustrates one embodiment in which multiple instances of a data repository abstraction component coexist in a single application space.

As noted above, one embodiment provides multiple instances of the data respitory abstraction components 148 which coexist in a single application space. One embodiment illustrating such an environment is shown in FIG. 3. The environment 300 generally comprises an application layer 310 (defined by the application 140), a data abstraction layer 320, and a physical data layer 330. The environment 300 shows two users 340, 350 accessing the physical data layer 330 via the application layer 320 using, e.g., application 140 of FIG. 1 (e.g., by issuing abstract queries $202_1$ and $202_2$ of FIG. 2B). Accordingly, the application layer 320 may comprise a data query builder component adapted to enable the users to build abstract queries.

The users 340, 350 are accessing the same physical data layer 330 through a common application layer 320. However, the data being exposed to the respective users 340, 350 is not the same. Rather, each user is exposed to selected portions of component which services logical data access of the data query builder component to the physical data in physical data layer 330.

In the present example, the first data repository abstraction (DRA1 342) exposes all of a first database 344 (registration database) and TABLE 1 of a second database 354 (payroll database), while the second data repository abstraction (DRA2 352) exposes the entire second database 354 and TABLE 1 of the first database 344. It should be noted that the particular data exposed by the respective data repository abstraction components is merely illustrative. More generally, any portion of the databases 344, 354 may be exposed, as well as any other databases of the data abstraction layer 320. By way of illustration, the environment 300 shows two users (340, 350), however, more generally any number of users may be accessing the data of the physical data layer 330.

Figure 4:
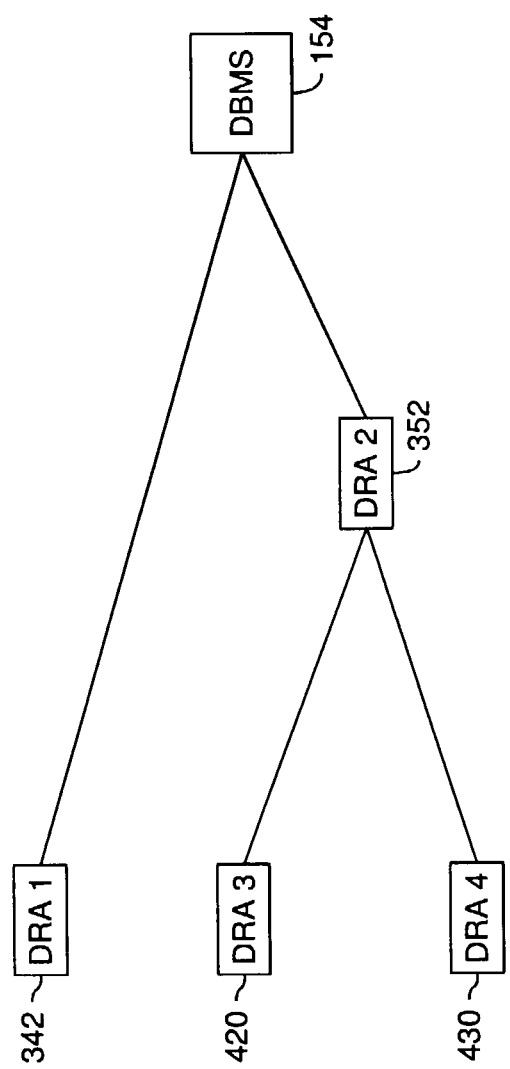
FIG. 4 illustrates an environment with plural data repository abstraction components.

FIG. 4 illustrates an embodiment in which data repository abstraction components reference one another. Specifically, the second data repository abstraction component DRA2 352 of FIG. 3 is illustrated as a parent with respect to a third data repository abstraction component DRA3 420 (a child) and a fourth data repository abstraction component DRA4 430. In this relationship, the third and/or fourth data repository abstraction components DRA3 420, DRA4 430 may inherit a portion of the definition of the second data repository abstraction component DRA2 352. In more detail, a portion of the logical fields provided in the second data repository abstraction component DRA2 352, which is not comprised in the third and/or fourth data repository abstraction components DRA3 420, DRA4 430, may be included therein by inheritance. Alternatively, the third and/or fourth data repository abstraction component DRA3 420, DRA4 430 may override portions of the second data repository abstraction component DRA2 352 and/or include additional definitions, e.g., logical fields not found in the second data repository extraction component DRA2 352. Still alternatively, the second data repository abstraction component DRA2 352 may be constructed by a combination of the definitions and/or logical fields comprised in the third and fourth data repository abstraction components DRA3 420, DRA4 430.

Figure 5:
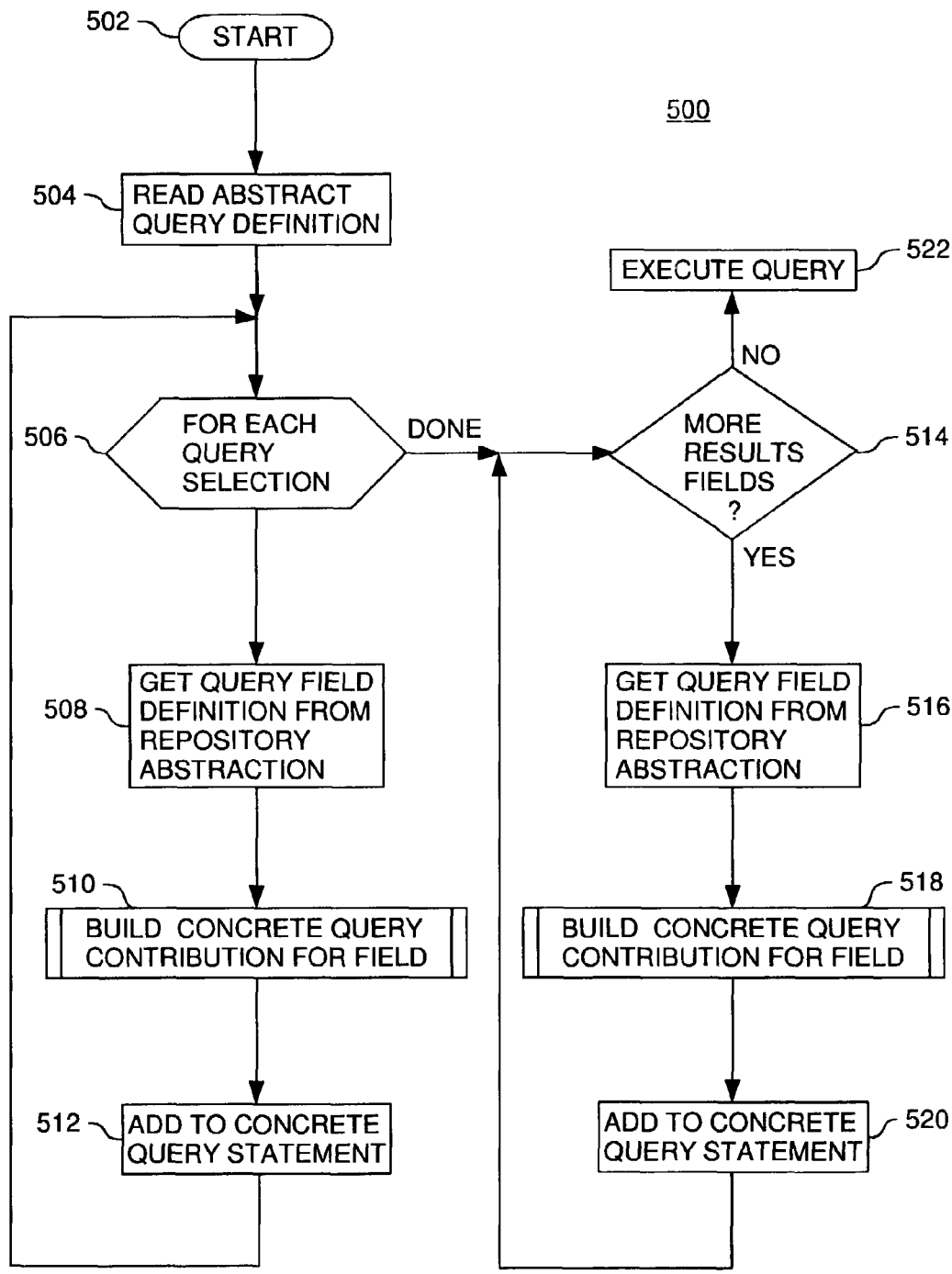
FIG. 5 is a flow chart illustrating the operation of a runtime component.

FIG. 5 shows an illustrative runtime method 500 exemplifying one embodiment of the operation of the runtime component 150 of FIG. 1. The method 500 is entered at step 502 when the runtime component 150 receives as input an instance of an abstract query (such as the abstract query 202 shown in FIG. 2). In step 504, the runtime component 150 reads and parses the instance of the abstract query and locates individual selection criteria and desired result fields. At step 506, the runtime component 150 enters a loop (comprising steps 506, 508, 510 and 512) for processing each query selection criteria statement present in the abstract query, thereby building a data selection portion of a Concrete Query. In one embodiment, a selection criterion consists of a field name (for a logical field), a comparison operator (=, <, >, etc) and a value expression (what is the field being compared to). In step 508, the runtime component 150 uses the field name from a selection criterion of the abstract query to look up the definition of the field in the data repository abstraction 148. As noted above, the field definition includes a definition of the access method used to access the physical data associated with the field. The runtime component 150 then builds (step 510) a Concrete Query Contribution for the logical field being processed. As defined herein, a Concrete Query Contribution is a portion of a concrete query that is used to perform data selection based on the current logical field. A concrete query is a query represented in languages like SQL and XML and is consistent with the data of a given physical data repository (e.g., a relational database or XML repository). Accordingly, the concrete query is used to locate and retrieve data from the physical data repository, represented by the DBMS 154 shown in FIG. 1. The Concrete Query Contribution generated for the current field is then added to a Concrete Query Statement. The method 500 then returns to step 506 to begin processing for the next field of the abstract query. Accordingly, the process entered at step 506 is iterated for each data selection field in the abstract query, thereby contributing additional content to the eventual query to be performed.

At various times during method 500, the runtime component 150 may determine whether locking processes should be performed. Illustrative embodiments will be described with reference to FIG. 7 below.

As described above, in one embodiment, the abstract query defines a list of abstract fields that are to be returned as a result of query execution, referred to herein as a result specification. A result specification in the abstract query may consist of a field name and sort criteria.

Accordingly, the method 500 enters a loop at step 514 (defined by steps 514, 516, 518 and 520) to add result field definitions to the concrete query being generated. In step 516, the runtime component 150 looks up a result field name (from the result specification of the abstract query) in the data repository abstraction 148 and then retrieves a Result Field Definition from the data repository abstraction 148 to identify the physical location of data to be returned for the current logical result field. The runtime component 150 then builds (as step 518) a Concrete Query Contribution (of the concrete query that identifies physical location of data to be returned) for the logical result field. In step 520, Concrete Query Contribution is then added to the Concrete Query Statement. Once each of the result specifications in the abstract query has been processed, the query is executed at step 522.

Figure 6:
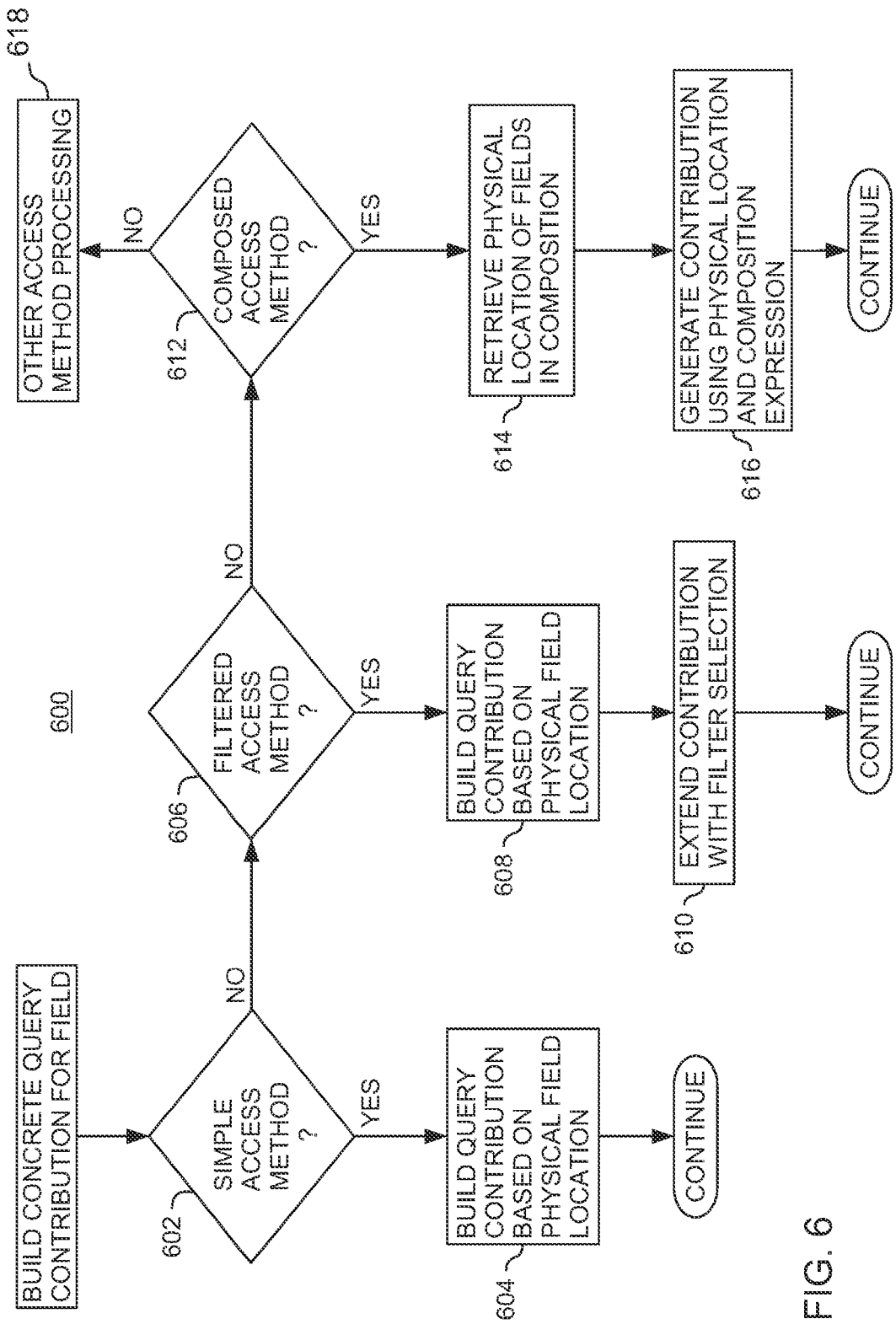
FIG. 6 is a flow chart illustrating the operation of a runtime component.

One embodiment of a method 600 for building a Concrete Query Contribution for a logical field according to steps 510 and 518 is described with reference to FIG. 6. In step 602, the method 600 queries whether the access method associated with the current logical field is a simple access method. If so, the Concrete Query Contribution is built (step 604) based on physical data location information and processing then continues according to method 500 described above. Otherwise, processing continues to step 606 to query, whether the access method associated with the current logical field is a filtered access method. If so, the Concrete Query Contribution is built (step 608) based on physical data location information for some physical data entity. In step 610, the Concrete Query Contribution is extended with additional logic (filter selection) used to subset data associated with the physical data entity. Processing then continues according to method 500 described above.

If the access method is not a filtered access method, processing proceeds from step 606 to step 612 where the method 600 queries whether the access method is a composed access method. If the access method is a composed access method, the physical data location for each sub-field reference in the composed field expression is located and retrieved in step 614. In step 616, the physical field location information of the composed field expression is substituted for the logical field references of the composed field expression, whereby the Concrete Query Contribution is generated. Processing then continues according to method 500 described above.

If the access method is not a composed access method, processing proceeds from step 612 to step 618. Step 618 is representative of any other access methods types contemplated as embodiments of the present invention. However, it should be understood that embodiments are contemplated in which less than all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 600. For example, the conversion may be performed as part of, or immediately following, the steps 604, 608 and 616. A subsequent conversion from the format of the physical data to the format of the logical field is performed after the query is executed at step

522. Of course, if the format of the logical field definition is the same as the underlying physical data, no conversion is necessary.

In various embodiments, numerous advantages over the prior art are provided. In one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case where a given physical data representation is modified or restructured, the corresponding data repository abstraction is updated to reflect changes made to the underlying physical data model. The same set of logical fields is available for use by queries, and has merely been bound to different entities or locations in a physical data model. As a result, requesting entities written to the abstract query interface continue to function unchanged, even though the corresponding physical data model has undergone significant change. In the event a requesting entity is to be used with a completely new physical data representation than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

In another aspect, the ease-of-use for the application builder and the end-user is facilitated. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data repository abstraction provides a data filtering mechanism, exposing pertinent data and hiding nonessential content that is not needed by a particular class end-user developing the given query.

It should be noted that any reference herein to particular values, definitions, programming languages and examples is merely for purposes of illustration. Accordingly, the invention is not limited by any particular illustrations and examples. Further, while aspects of the invention are described with reference to SELECTION operations, other input/output operation are contemplated, including well-known operations such as ADD, MODIFY, INSERT, DELETE and the like. Of course, certain access methods may place restrictions on the type of abstract query functions that can be defined using fields that utilize that particular access method. For example, fields involving composed access methods are not viable targets of MODIFY, INSERT and DELETE.

Figure 7:
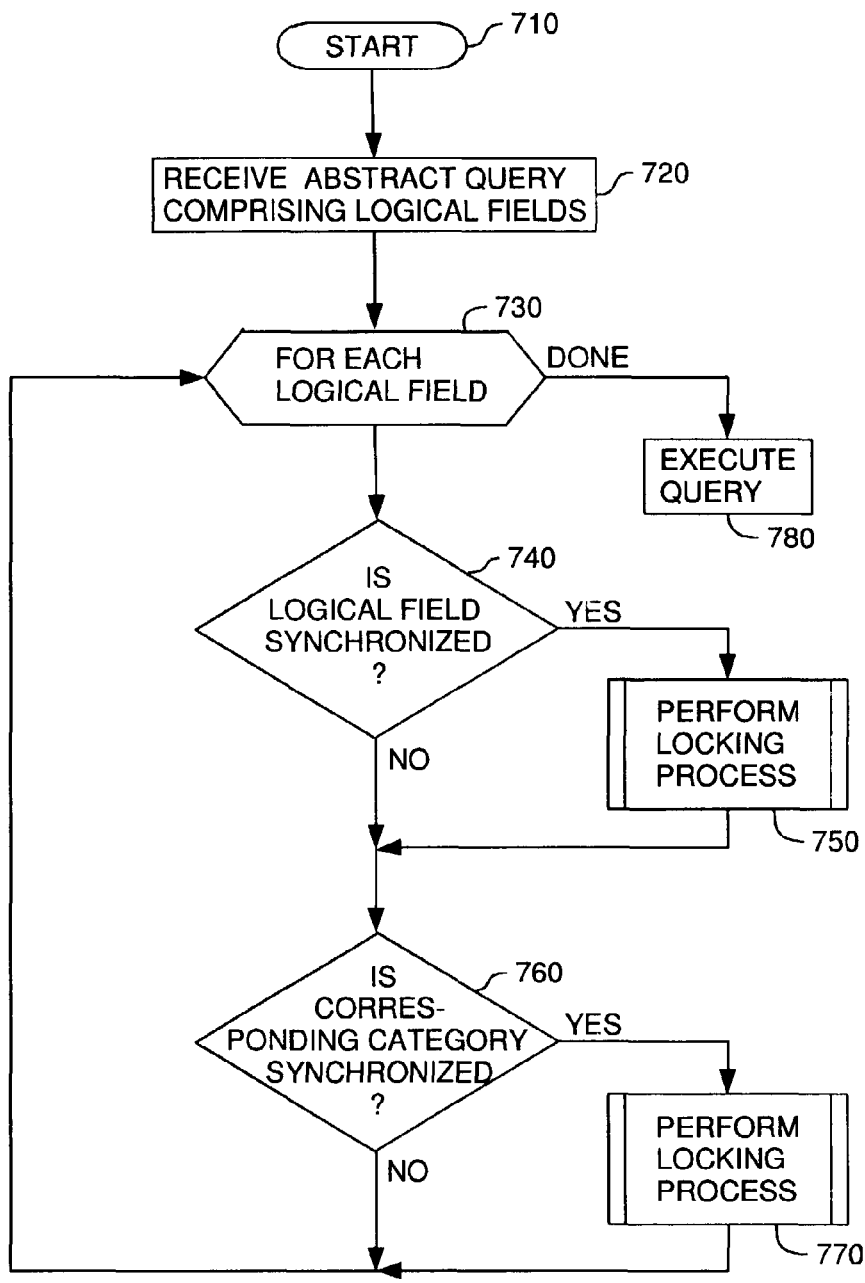
FIG. 7 is a flow chart illustrating handling of a received abstract query.
Figure 8:
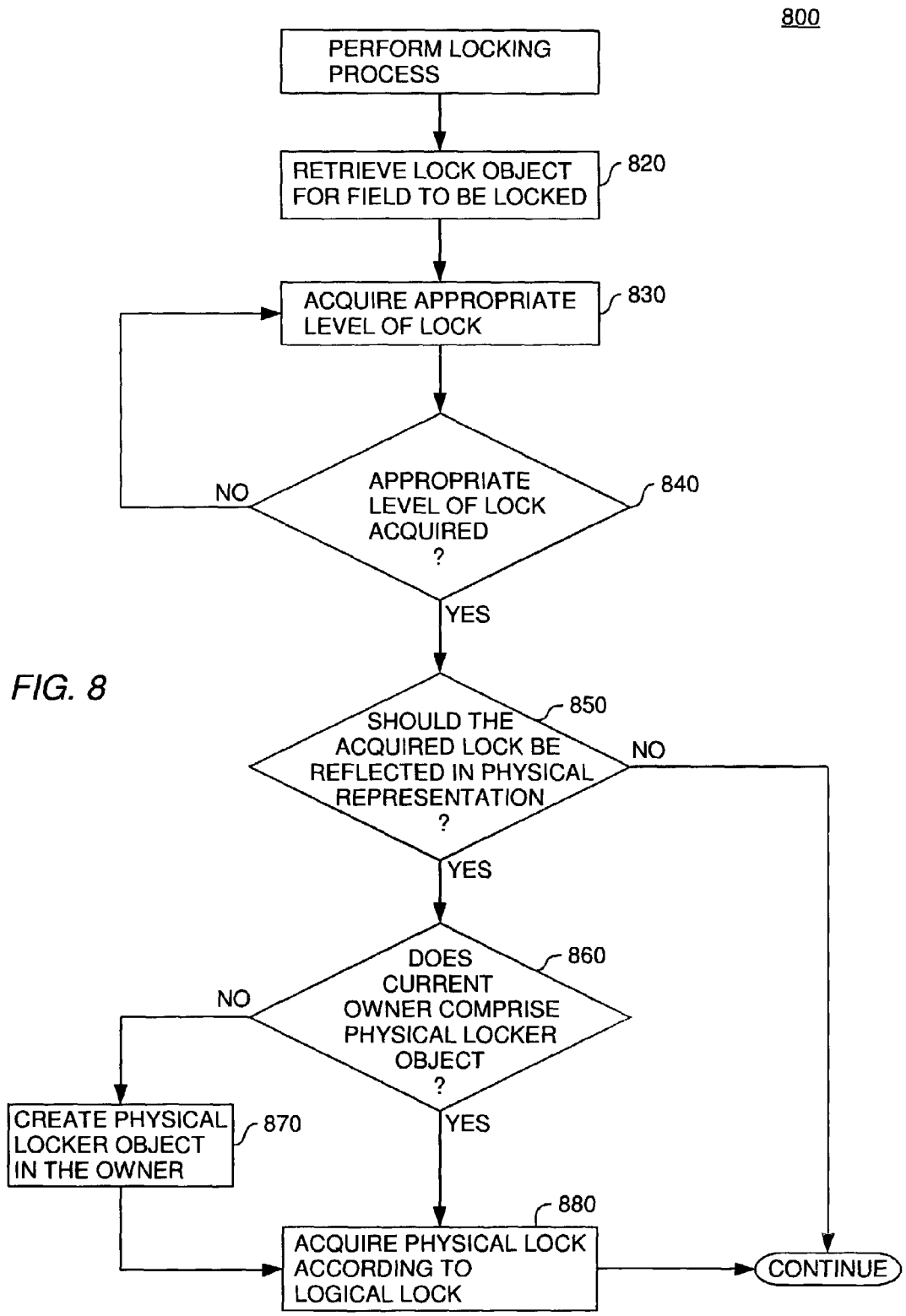
FIG. 8 is a flow chart illustrating a locking process according to an embodiment of the invention.
Figure 9:
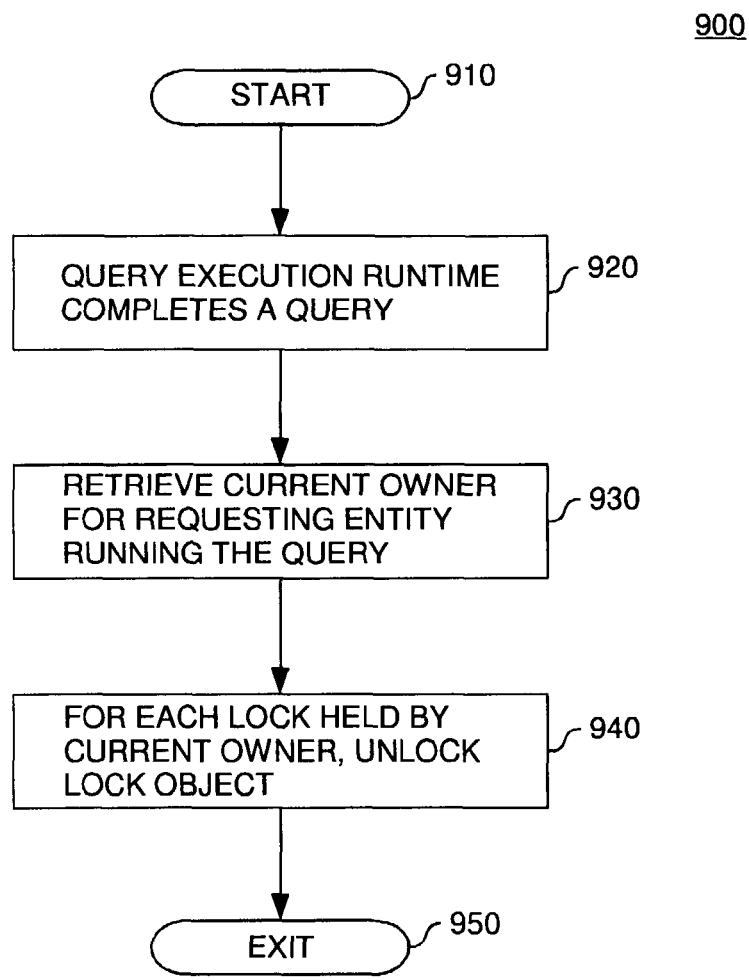
FIG. 9 is a flow chart illustrating an unlocking process.

FIGS. 7, 8 and 9 are flowcharts which collectively illustrate an embodiment of handling an abstract query (e.g. query $202_1$ or $202_2$ of FIG. 2B) issued by a requesting entity, to determine if allocking process should be performed to prevent alterations of data in a database when a query is executed against the database, to perform the locking process and to unlock logical and physical locks after query execution is completed. Methods 700, 800 and 900 may be performed by a lock manager (e.g., lock manager 210 of FIG. 2B, which may itself be a component of runtime component 150 of FIG. 1).

Reference is made first to a method 700 of FIG. 7. Method 700 starts at step 710. In step 720, an abstract query having at least one logical field of a plurality of logical fields from a logical representation of data is received. The logical representation defines the plurality of logical fields abstractly describing associated physical entities of the data.

At step 730, method 700 enters a loop (defined by steps 740, 750, 760 and 770) for processing each logical field present in the abstract query, thereby determining whether a locking process needs to be performed at steps 750 and/or 770. If all logical fields in the abstract query have been processed, the abstract query is executed against the database at step 780.

Executing the abstract query may involve performing a method according to method 500 of FIG. 5 to transform the abstract query into a concrete query executable against the underlying physical representation of the data in the database. For instance, after building the data selection portion of the concrete query according to steps 506 to 512 of FIG. 5, the runtime component 150 may enter step 730 to determine, whether one or more locking processes need to be performed for one or more logical fields and physical entities of data, and then continue with step 514 of FIG. 5 to identify the information to be returned as a result of query execution. Alternatively, method 500 may branch to step 740 of FIG. 7 after the runtime component 150 has used the field name from a selection criterion of the abstract query to look up the definition of the field in the data repository abstraction 148 in step 508 and return to step 510 after step 760 or 770 of FIG. 7. Still alternatively, the runtime component 150 may perform locking processes independent of method 500 in a separate operation, as described with respect to FIG. 7.

At step 740 the runtime component 150 determines whether executing the abstract query against the database requires a logical lock on a given logical field according to the presence of a synchronization indication for the logical field (e.g., synchronization indication $232_3$ of logical field $208_4$ of FIG. 2B). More specifically, if the logical field is marked as synchronized, a logical lock on the logical field is required. If the logical field is not marked as synchronized, or does not include a corresponding synchronization indication, no logical lock is required. If it is determined that executing the abstract query requires the logical lock on the logical field, logically locking the logical field is performed at step 750 and the method continues at step 760. If no logical lock is required, the method continues at step 760.

When determining whether a logical lock on the logical field is required, it may further be determined whether executing the abstract query against the database requires a physical lock on a physical entity of the data, corresponding to the logical field. In one embodiment, the runtime component 150 makes this determination according to whether a lock item indication is specified for the logical field (e.g., lock item indication $250_1$ of logical field $208_4$ of FIG. 2B) indicating that a physical lock is required. In another embodiment, the runtime component 150 makes this determination with reference to a value of a lock item indication specified for the logical field. The runtime component 150 determines the value of the lock item indication (e.g., the value of lock item indication $250_1$ of logical field $208_4$ of FIG. 2B) and if the value of the lock item indication is set to "No", a physical lock on the physical data is not required and if the value of the lock item indication is set to "Yes", then a physical lock on the physical data is required. If such a physical lock on the corresponding physical entity is required, physically locking the corresponding physical entity may also be performed at step 750. An illustrative embodiment of the locking process at step 750 will be described with reference to FIG. 8.

As noted above, it is contemplated that some logical fields may belong to common categories. Accordingly, at step 760 the runtime component 150 determines whether executing the abstract query against the database requires a logical lock on a category specification of a category corresponding to the logical field processed at step 740. Specifically, the runtime component 150 determines whether the category specification includes a synchronization indication (e.g., synchronization indication $232_2$ in category specification $208_5$ of FIG. 2B) indicating that a logical lock on the category is required. If it is determined that executing the abstract query requires the logical lock on the category, logically locking the category is performed at step 770 and the method continues at step 730 for processing the next logical field of the logical representation. If no logical lock is required, the method continues at step 730.

When determining whether a logical lock on the category is required, it may further be determined (at step 740) whether executing the abstract query against the database requires a physical lock on a physical entity of the data corresponding to the category specification. As explained above with respect to the logical fields, this may be done by determining whether the category specification includes a lock item indication indicating that a physical lock on the entity corresponding to the category is required. If such a physical lock on the corresponding physical entity is required, physically locking the corresponding physical entity may also be performed at step 770.

One embodiment of a method 800 of performing a locking process according to step 750 or 770 of FIG. 7 is described in FIG. 8. Specifically, FIG. 8 describes physically locking a physical entity of data corresponding to the logical field (e.g. columns "l_name" and "city" in table $214_2$ "contact" that correspond to logical field $208_4$ of FIG. 2B).

Step 820 determines, whether the logical field includes a lock object identification (e.g., lock object identification $240_1$ of logical field $208_4$ of FIG. 2B). If the determination is affirmative, the associated lock object (e.g., lock object "Lock Object 1" $210_1$ of FIG. 2B) is retrieved for locking. Furthermore, the requesting entity is identified to determine the owner (e.g., owner object $210_3$ of FIG. 2B) for the abstract query (e.g., query $202_1$ of FIG. 2B).

Step 830 attempts to acquire an appropriate level of logical lock from the logical field. Therefore, it is determined whether the logical field comprises a lock type indication (e.g., lock type indication $270_1$ of FIG. 2B, which is set to "Exclusive"). If the appropriate level of the logical lock cannot be determined, method 800 enters a loop at step 840 to wait at step 830 until the appropriate level can be acquired. In order to acquire the appropriate level of logical lock, a user or administrator of the underlying physical representation may be prompted to indicate the level. Alternatively, if after a given period of time no level could be determined, a default level as, e.g., "Exclusive" could be set. If the appropriate level can be determined, method 800 continues at step 850.

Step 850 determines whether the physical entity of the data corresponding to the logical field should be physically locked, e.g., by determining a value of a lock item indication (e.g., the value of lock item indication $250_1$ of logical field $208_4$ of FIG. 2B) of the logical field as explained above. If the value of the lock item indication is set to "No", processing continues according to method 700 described above.

Otherwise, if the lock item indication value is set to "Yes", step 860 determines whether the owner contains a physical locker (e.g., physical locker $260_1$ of FIG. 2B) for the physical entity of the data. The physical locker is used to physically lock the physical entity of the data to reflect the logical lock on the logical field held by the owner. According to one embodiment, in which the database is a relational database, the physical locker is a SQL connection to the physical entity.

If the owner does not contain a physical locker, method 800 continues at step 870, else the method 800 continues at step 880 described below. Step 870 creates a physical locker in the owner object in order to enable the owner object to physically lock the physical entity of the data to reflect the logical lock on the logical field held by the owner, if required, and then proceeds with step 880.

Step 880 physically locks the physical entity of the data using the physical locker. More specifically, a physical lock is acquired according to the logical lock on the logical field using mechanisms provided by the underlying physical representation. According to the embodiment, wherein the database is a relational database, the mechanisms used are a LOCK TABLE SQL statement and running a particular SQL statement that accesses the physical entity of the data to physically lock the entity. After physically locking the physical entity of the data, processing continues according to method 700 described above.

FIG. 9 describes one embodiment of a method 900 of unlocking logical and physical locks after execution of the query issued from the requesting entity against the database is completed. Method 900 starts at step 910.

In step 920, if the query execution has been completed, query execution runtime (e.g., runtime component 150 of FIG. 1) completes the query. In step 930, the owner, i.e., the owner object of the requesting entity running the query (e.g., owner object $210_3$ of FIG. 2B) is retrieved. Step 940 determines from the owner object the logical and physical locks held by the owner and, for each lock on a corresponding lock object, unlocks the corresponding lock object. Method 900 ends up at step 950.

While the foregoing is directed to embodiments of the present invention, other and further embodiments of the invention may be devised without departing from the basic scope thereof, and the scope thereof is determined by the claims that follow.

What is claimed is:

1. A computer-implemented method of preventing alterations of data in a database when a query is executed against the database, comprising:
   providing a logical representation of the data defining a plurality of logical fields abstractly describing a manner of accessing and exposing, via a user interface, associated physical entities of the data, wherein each of the plurality of logical fields include a reference to an access method selected from at least two different access method types; wherein the at least two different access method types are selected from the group comprising: (i) a simple access method which maps a respective one of the plurality of logical fields directly to a physical entity, (ii) a filtered access method which identifies a physical entity and provides rules used to define a subset of items within the physical entities, and (iii) a composed access method which computes a value for a respective one of the plurality of logical fields from one or more physical entities using an expression supplied as part of a composed access method definition; wherein each of the different access methods types defines a different manner of exposing the respective physical entities of the data; and wherein at least a portion of the plurality of logical fields include lock attributes referenced in order to lock the respective logical field;

receiving an abstract query comprising at least one logical field of the portion of logical fields;

in response to receiving the abstract query, locking, on the basis of the respective lock attributes, the at least one logical field before executing the abstract query; and unlocking at least one logical field after executing the abstract query.

2. The method of claim 1, wherein the lock attributes of the at least one logical field comprise a synchronization indication of whether a lock on the logical field is required or not, and wherein locking the at least one logical field comprises:

determining, from the synchronization indication, whether executing the abstract query against the database requires a lock on the at least one logical field; and locking the at least one logical field, only if executing the abstract query requires the lock on the at least one logical field.

3. The method of claim 1, wherein the lock attributes of the at least one logical field comprises a synchronization indication of whether a lock on the logical field is required or not and a lock item indication of whether a lock on a corresponding physical entity of the data is required or not, and wherein locking the at least one logical field comprises:

upon determining, from the synchronization indication, that executing the abstract query against the database requires a lock on the at least one logical field, locking the at least one logical field; and upon determining, from the lock item indication, that executing the abstract query against the database requires a lock on the corresponding physical entity of the data, locking the corresponding physical entity before executing the abstract query.

4. The method of claim 1, wherein the lock attributes of the at least one logical field comprises a lock item indication of whether a lock on a corresponding physical entity of the data is required or not, and wherein locking the at least one logical field comprises:

upon determining, from the lock item indication, that executing the abstract query against the database requires a lock on the corresponding physical entity of the data, locking the corresponding physical entity before executing the abstract query.

5. The method of claim 1, wherein the database is one of a hierarchical, a relational and an XML type database.

6. A computer-implemented method of preventing alterations of physical entities of data in a database when a query is executed against the database, comprising:

providing a logical representation of the data defining a multiplicity of logical fields, each logical field abstractly describing a manner of accessing and exposing, via a user interface, an associated physical entity of the data; wherein each of the multiplicity of logical fields include a reference to an access method selected from at least two different access method types; wherein the at least two different access method types are selected from the group comprising: (i) a simple access method which maps a respective one of the plurality of logical fields directly to a physical entity, (ii) a filtered access method which identifies a physical entity and provides rules used to define a subset of items within the physical entities, and (iii) a composed access method which computes a value for a respective one of the plurality of logical fields from one or more physical entities using an expression supplied as part of a composed access method definition;

wherein each of the different access methods types defines a different manner of exposing the respective physical entity of the data; and wherein at least a portion of the multiplicity of logical fields include lock attributes referenced in order to lock the respective logical field;

providing a lock object for each logical field of a plurality of logical fields forming a subset of the multiplicity of logical fields, the respective lock object being identified by the respective lock attributes of the respective logical field;

receiving an abstract query from a requesting entity comprising at least one logical field of the multiplicity of logical fields; and upon determining that executing the abstract query against the database requires the lock on the at least one logical field;

determining the lock object of the at least one logical field;

locking the lock object for the requesting entity for locking the at least one logical field before executing the abstract query; and unlocking the lock object for the requesting entity after executing the abstract query.

7. The method of claim 6, wherein the requesting entity is one of a user and an application.

8. The method of claim 6, further comprising:

running an update on a physical entity of the data in the database corresponding to the at least one logical field, comprising:

accessing the lock object; and determining that the lock object is locked, delaying the update.

9. The method of claim 6, wherein locking the lock object comprises setting a corresponding flag in an owner object associated with the requesting entity.

10. The method of claim 6, wherein receiving an abstract query comprises receiving a plurality of abstract queries associated with a plurality of requesting entities, and wherein locking the at least one logical field comprises locking a corresponding lock object for each requesting entity of the plurality of requesting entities.

11. The method of claim 10, wherein the requesting entity is one of a user and an application.

12. The method of claim 6, wherein the lock attributes of the at least one logical field comprises a synchronization indication of whether a lock on the logical field is required or not, and wherein locking the lock object for the requesting entity comprises:

upon determining, from the synchronization indication, that executing the abstract query against the database requires a lock on the at least one logical field, locking the lock object.

13. The method of claim 6, wherein the lock attributes of the at least one logical field comprises a synchronization indication of whether a lock on the logical field is required or not and a lock item indication of whether a lock on a corresponding physical entity of the data is required or not, and wherein locking the lock object for the requesting entity comprises:

upon determining, from the synchronization indication, that executing the abstract query against the database requires a lock on the at least one logical field, locking the lock object; and upon determining, from the lock item indication, whether executing the abstract query against the database requires a lock on the corresponding physical entity of the data, locking the corresponding physical entity before executing the abstract query.

14. The method of claim 6, wherein the lock attributes of the at least one logical field comprises a lock item indication of whether a lock on a corresponding physical entity of the data is required or not, and wherein locking the lock object for the requesting entity comprises:

upon determining, from the lock item indication, that executing the abstract query against the database requires a lock on the corresponding physical entity of the data, locking the corresponding physical entity before executing the abstract query.

15. The method of claim 6, wherein the database is one of a hierarchical, a relational and an XML type database.

16. A tangible computer-readable storage medium containing a program which, when executed by a processor, performs an operation of preventing alterations of data in a database when a query is executed against the database, the operation comprising:

providing a logical representation of the data defining a plurality of logical fields abstractly describing a manner of accessing and exposing, via a user interface, associated physical entities of the data, wherein each of the plurality of logical fields include a reference to an access method selected from at least two different access method types; wherein the at least two different access method types are selected from the group comprising: (i) a simple access method which maps a respective one of the plurality of logical fields directly to a physical entity, (ii) a filtered access method which identifies a physical entity and provides rules used to define a subset of items within the physical entities, and (iii) a composed access method which computes a value for a respective one of the plurality of logical fields from one or more physical entities using an expression supplied as part of a composed access method definition; wherein each of the different access methods types defines a different manner of exposing the respective physical entities of the data; and wherein at least a portion of the plurality of logical fields include lock attributes referenced in order to lock the respective logical field;

receiving an abstract query comprising at least one logical field of the portion of logical fields;

in response to receiving the abstract query, locking the at least one logical field before executing the abstract query on the basis of the respective lock attributes of the at least one logical field; and unlocking at least one logical field after executing the abstract query.

17. The computer-readable storage medium of claim 16, wherein the lock attributes of the at least one logical field comprises a synchronization indication of whether a lock on the logical field is required or not, and wherein locking the at least one logical field comprises:

upon determining, from the synchronization indication, that executing the abstract query against the database requires a lock on the at least one logical field, locking the at least one logical field.

18. The computer-readable storage medium of claim 16, wherein the lock attributes of the at least one logical field comprises a synchronization indication of whether a lock on the logical field is required or not and a lock item indication of whether a lock on a corresponding physical entity of the data is required or not, and wherein locking the at least one logical field comprises:

upon determining, from the synchronization indication, that executing the abstract query against the database requires a lock on the at least one logical field, locking the at least one logical field; and upon determining, from the lock item indication, that executing the abstract query against the database requires a lock on the corresponding physical entity of the data, locking the corresponding physical entity before executing the abstract query.

19. The computer-readable storage medium of claim 16, wherein the lock attributes of the at least one logical field comprises a lock item indication of whether a lock on a corresponding physical entity of the data is required or not, and wherein locking the at least one logical field comprises:

upon determining, from the lock item indication, that executing the abstract query against the database requires a lock on the corresponding physical entity of the data, locking the corresponding physical entity before executing the abstract query.

20. The computer-readable storage medium of claim 16, wherein the abstract query comprises at least one selection criterion and a result specification.

21. The computer-readable storage medium of claim 16, further comprising transforming the abstract query into a query consistent with the particular physical representation according to properties described in the at least one logical field.

22. The computer-readable storage medium of claim 21, where the query consistent with the particular physical representation is one of an SQL query and an XML query.

23. The computer-readable storage medium of claim 16, wherein each logical field comprises an access method for the associated physical entity of the data.

24. The computer-readable storage medium of claim 23, wherein the access method describes a location of the associated physical entity in the database.

25. The computer-readable storage medium of claim 16, wherein the database is one of a hierarchical, a relational and an XML type database.

26. A tangible computer-readable storage medium containing a program which, when executed by a processor, performs an operation of preventing alterations of physical entities of data in a database when a query is executed against the database, the operation comprising:

providing a logical representation of the data defining a multiplicity of logical fields, each logical field abstractly describing a manner of accessing and exposing, via a user interface, an associated physical entity of the data; wherein each of the multiplicity of logical fields include a reference to an access method selected from at least two different access method types; wherein the at least two different access method types are selected from the group comprising: (i) a simple access method which maps a respective one of the plurality of logical fields directly to a physical entity, (ii) a filtered access method which identifies a physical entity and provides rules used to define a subset of items within the physical entities, and (iii) a composed access method which computes a value for a respective one of the plurality of logical fields from one or more physical entities using an expression supplied as part of a composed access method definition; wherein each of the different access methods types defines a different manner of exposing the respective physical entity of the data; and wherein at least a portion of the multiplicity of logical fields include lock attributes referenced in order to lock the respective logical field;

providing a lock object for each logical field of a plurality of logical fields forming a subset of the multiplicity of logical fields, the respective lock object being identified by the respective lock attributes of the respective logical field;

receiving an abstract query from a requesting entity comprising at least one logical field of the multiplicity of logical fields; and upon determining that executing the abstract query against the database requires the lock on the at least one logical field:
  determining the lock object of the at least one logical field;
  locking the lock object for the requesting entity for locking the at least one logical field before executing the abstract query; and
  unlocking the lock object after executing the abstract query.

27. The computer-readable storage medium of claim 26, wherein the requesting entity is one of a user and an application.

28. The computer-readable storage medium of claim 26, wherein the operation further comprises:
running an update on a physical entity of the data in the database corresponding to the at least one logical field, comprising:
  accessing the lock object; and
  upon determining that the lock object is locked, delaying the update.

29. The computer-readable storage medium of claim 26, wherein locking the lock object comprises setting a corresponding flag in an owner object associated with the requesting entity.

30. The computer-readable storage medium of claim 26, wherein receiving an abstract query comprises receiving a plurality of abstract queries associated with a plurality of requesting entities, and wherein locking the at least one logical field comprises locking a corresponding lock object for each requesting entity of the plurality of requesting entities.

31. The computer-readable storage medium of claim 30, wherein the requesting entity is one of a user and an application.

32. The computer-readable storage medium of claim 26, wherein the lock attributes of the at least one logical field comprises a synchronization indication of whether a lock on the logical field is required or not, and wherein locking the lock object for the requesting entity comprises:
  determining, from the synchronization indication, whether executing the abstract query against the database requires a lock on the at least one logical field; and
  only if executing the abstract query requires the lock on the at least one logical field, locking the lock object.

33. The computer-readable storage medium of claim 26, wherein the lock attributes of the at least one logical field comprises a synchronization indication of whether a lock on the logical field is required or not and a lock item indication of whether a lock on a corresponding physical entity of the data is required or not, and wherein locking the lock object for the requesting entity comprises:
  upon determining, from the synchronization indication, that executing the abstract query against the database requires a lock on the at least one logical field, locking the at least one logical field; and
  upon determining, from the lock item indication, that executing the abstract query against the database requires a lock on the corresponding physical entity of the data, locking the corresponding physical entity before executing the abstract query.

34. The computer-readable storage medium of claim 26, wherein the lock attributes of the at least one logical field comprises a lock item indication of whether a lock on a corresponding physical entity of the data is required or not, and wherein locking the lock object for the requesting entity comprises:
  upon determining, from the lock item indication, that executing the abstract query against the database requires a lock on the corresponding physical entity of the data, locking the corresponding physical entity before executing the abstract query.

35. The computer-readable storage medium of claim 26, wherein the database is one of a hierarchical, a relational and an XML type database.

36. A computer, comprising:
a processor;
a database containing data;
a data abstraction model defining a plurality of logical fields abstractly defining a manner of accessing and exposing, via a user interface, the data; wherein each of the plurality of logical fields include a reference to an access method selected from at least two different access method types; wherein the at least two different access method types are selected from the group comprising: (i) a simple access method which maps a respective one of the plurality of logical fields directly to a physical entity, (ii) a filtered access method which identifies a physical entity and provides rules used to define a subset of items within the physical entities, and (iii) a composed access method which computes a value for a respective one of the plurality of logical fields from one or more physical entities using an expression supplied as part of a composed access method definition; wherein each of the different access methods types defines a different manner of exposing respective physical entities of the data; and wherein at least a portion of the plurality of logical fields include lock attributes referenced in order to lock the respective logical field;
a query building application for building abstract queries according to the data abstraction model;
a runtime component configured to transform the abstract queries into concrete queries having a form consistent with the data; and
a locking mechanism for selectively locking, on the basis of their respective lock attributes, one or more logical fields of an abstract query, prior to execution of a concrete query in which the abstract query has been transformed by the runtime component, to prevent alterations of the data while a concrete query, corresponding to the abstract query after being transformed, is executed against the database, and for unlocking the one or more logical fields after execution of the concrete query.

* * * * *